United States Patent [19]
Greitzer et al.

[11] Patent Number: 5,081,956
[45] Date of Patent: Jan. 21, 1992

[54] DOGHOUSE WITH UNIQUE MULTI-CHANNEL FLOW-THROUGH FRESH AIR VENTILATION

[75] Inventors: Steven Greitzer, Encino; Paul Thomas, San Pedro, both of Calif.

[73] Assignee: Camden Industries, Inc., Los Angeles, Calif.

[21] Appl. No.: 656,696

[22] Filed: Feb. 19, 1991

[51] Int. Cl.$^5$ .................................. A01K 1/02
[52] U.S. Cl. ............................ 119/19; 119/15
[58] Field of Search ............. 119/15, 16, 19, 20; 52/302, 95

[56] References Cited

U.S. PATENT DOCUMENTS

| | | | |
|---|---|---|---|
| 9,045 | 8/1835 | Harmony | 119/16 X |
| 920,975 | 5/1909 | Minion | 119/19 |
| 1,439,157 | 12/1922 | Ford | 119/16 |
| 1,576,330 | 3/1926 | Kamerer | 119/19 |
| 2,988,044 | 6/1961 | Adelberg et al. | 119/19 |
| 3,122,127 | 2/1964 | Shechmeister et al. | 119/19 |
| 3,324,831 | 6/1967 | St. Onge | 119/19 |
| 3,343,520 | 9/1967 | Schwarz, Jr. | 119/15 |
| 3,643,631 | 2/1972 | Wade et al. | 119/19 X |
| 3,793,989 | 2/1974 | Clark | 119/19 X |
| 3,961,603 | 6/1976 | Gaddie, Sr. | 119/15 |
| 4,109,427 | 8/1978 | O'Brian et al. | 119/19 X |

Primary Examiner—Gene Mancene
Assistant Examiner—Thomas Price
Attorney, Agent, or Firm—Thomas I. Rozsa

[57] ABSTRACT

A doghouse with multi-channel flow-through fresh air ventilation comprising a generally arcuate-shaped hollow top part which has a rectangular circumferential bottom rim configured with four sharp corners, and a generally box-shaped hollow bottom part which has an octagonal circumferential top rim configured with four cut corners. When the top part is detachably attached onto said bottom part by interlocking members to construct a doghouse, the rectangular circumferential bottom rim of the top part is adjacent to the octagonal circumferential top rim of the bottom part, and the four sharp corners of the rectangular circumferential bottom rim of the top part are located above the four cut corners of the octagonal circumferential top rim of the bottom part respectively to form four shielded and heightened openings facing downwardly, to thereby provide multi-channel flow-through fresh air ventilation for the doghouse.

24 Claims, 2 Drawing Sheets

Fig. 1. (PRIOR ART)
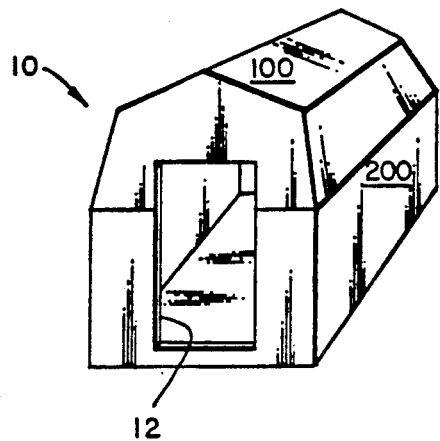
Fig. 2. (PRIOR ART)
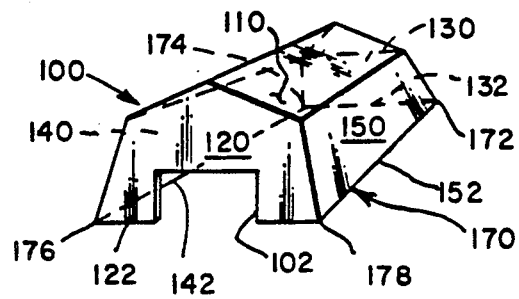
Fig. 3. (PRIOR ART)
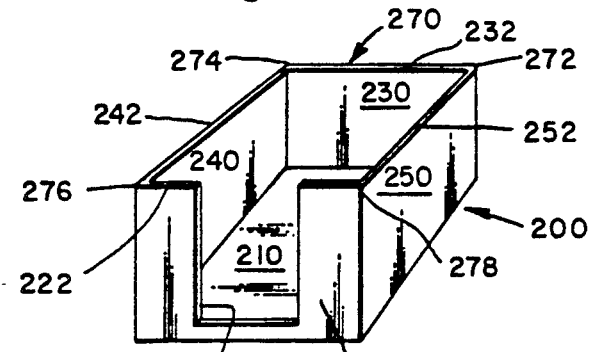
Fig. 4.
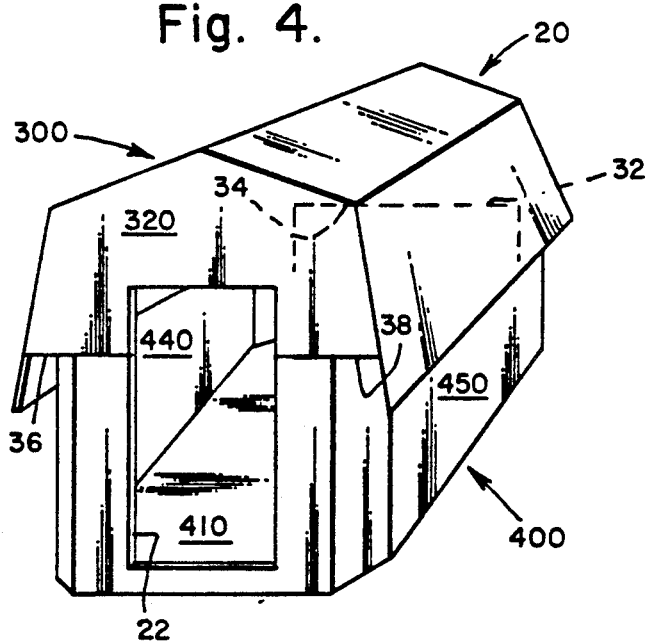
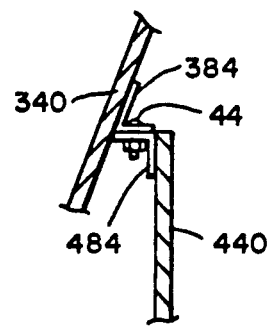
Fig. 7.

Fig. 5.
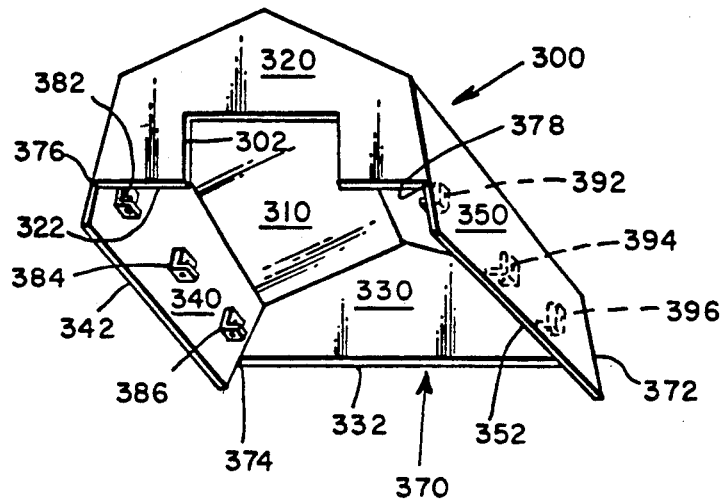
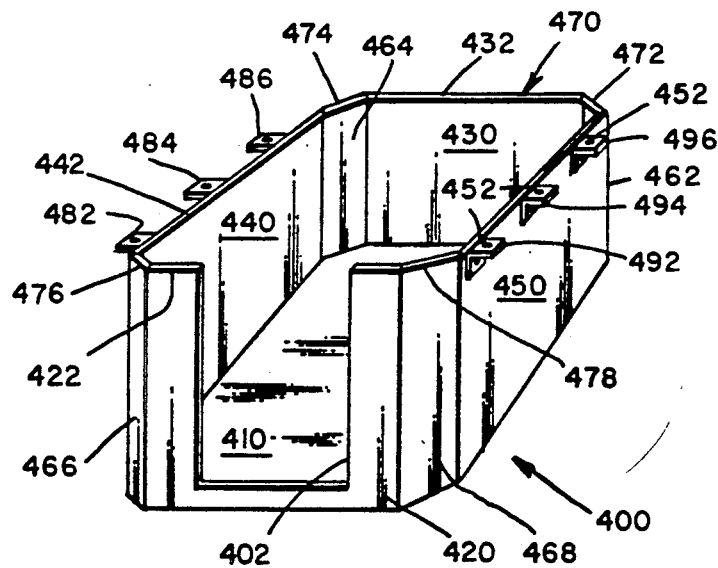
Fig. 6.

DOGHOUSE WITH UNIQUE MULTI-CHANNEL FLOW-THROUGH FRESH AIR VENTILATION

BACKGROUND OF THE INVENTION

1. Field of the Invention

The present invention relates to the field of shelters for pet animals. More particularly the present invention relates to the field of a new doghouse design which includes improved ventilation.

2. Description of the Prior Art

Numerous types of doghouses have been designed and used for sheltering dogs, both indoor and outdoor. A traditional design of doghouses is illustrated in FIG. 1 at 10. It usually has a front door opening 12. While the traditional design of doghouse 10 is able to provide basic sheltering for a dog, its structure has a major disadvantage; it does not provide enough fresh air ventilation for the inside chamber of the doghouse. Inside traditional doghouse 10 is a closed chamber which has only one door opening 12, connected to the outside of doghouse 10. At least two open channels are needed for adequate flow-through fresh air ventilation. Poor fresh air ventilation is harmful for the health of the dog. Furthermore, when used outdoors in hot summer seasons, the poor air ventilation of the traditional doghouse 10 makes inside doghouse 10 too warm for a dog to comfortably rest therein.

There are also doghouses constructed in other configurations, such as various dome-shaped configurations. However, most of these dome-shaped doghouses still have only one front door opening and thus still possess the above discussed disadvantage.

In the effort of eliminating the disadvantage of poor fresh air ventilation, some recently designed doghouses include a large opening on the rear or side wall of the doghouse to provide better air ventilation. In addition to a door opening, an extra opening serves as a window, which makes it possible for the fresh air to flow through the doghouse. However, such an improvement also has its drawbacks when used outdoors. First of all, those side windows are often vertically oriented and do not have any cover or shield. When it is raining outside, the raindrops can easily enter into the inside of the doghouses through the side windows. Second, in cold winter seasons, cold wind can directly blow through the window and the door opening, thus making the inside of the doghouse very cold.

Therefore, a new design for doghouses is needed. Such a design should provide adequate fresh air ventilation for a doghouse, while preventing the drawbacks created by having a vertical side window.

SUMMARY OF THE PRESENT INVENTION

The present invention is a doghouse providing unique multi-channel flow-through fresh air ventilation.

It is known that a good doghouse should provide adequate fresh air ventilation. It is also known that at least two open channels are needed to provide flow-through fresh air ventilation. However, most of the prior art doghouse designs only have one single door opening which does not provide enough fresh air ventilation. Some prior art doghouse designs have added an extra window on the rear or side wall of the doghouses which improves the air ventilation, but consequently reduces the protection for the dogs sheltered inside the doghouses during cold, windy or rainy weather conditions.

It has been discovered, according to the present invention, that if a doghouse is constructed with a multiplicity of openings, then it is able to provide multi-channel fresh air ventilation which is both sufficient and effective.

It has also been discovered, according to the present invention, that if an extra opening, such as a window on the rear or side wall of the doghouse is constructed vertically, then it is not able to prevent rain drops or cold wind from being blown into the doghouse through the vertical opening.

It has additionally been discovered, according to the present invention, that if the multiplicity of openings are constructed horizontally and facing downwardly, then it is able to prevent rain drops or cold wind from being blown into the doghouse through the openings.

It has further been discovered, according to the present invention, that if the hollow top part of a doghouse is constructed with four sharp corners along its rectangular circumferential bottom rim, and the hollow bottom part of the doghouse is constructed with four cut corners along its octagonal circumferential top rim, and when the top part is attached onto the bottom part, the four sharp corners of the bottom rim of the top part are aligned above the four cut corners of the top rim of the bottom part respectively, then each combination of sharp and cut corners will form a horizontal opening facing downwardly.

It has also been discovered, according to the present invention, that if utilizing the unique design of the present invention where both the top and the bottom part of the new design doghouse are simply configured without complex opening window structures, then both the top and the bottom parts can be easily molded as respective single pieces where the costs of molds and molding process are substantially reduced.

It has additionally been discovered, according to the present invention, that if the top part and the bottom part can both be respective single molded pieces, then they can be both made of molded plastic structural foam material, which offers great durability, thermal insulation, and flea, mildew and bacteria resistance.

It has further been discovered, according to the present invention, that if the molded top part and the molded bottom part are attached to each other by interlocking means, then they can be easily separated for cleaning.

It has also been discovered, according to the present invention, that if the floor of a doghouse is elevated, then the doghouse will provide extra insulation from the elements.

It is therefore an object of the present invention to provide a doghouse constructed with a multiplicity of openings which is able to provide multi-channel fresh air ventilation which is both sufficient and effective.

It is also an object of the present invention to provide a doghouse with a multiplicity of openings but without any vertical window on the rear or side wall which would allow rain drops or cold wind to blow into the doghouse through the openings.

It is an additional object of the present invention to provide a doghouse having a multiplicity of openings which are constructed horizontally and facing downwardly so that it is able to prevent rain drops or cold wind from being blown into the doghouse through the openings.

It is a further object of the present invention to provide a doghouse with a hollow top part constructed with four sharp corners along its rectangular circumferential bottom rim, and a hollow bottom part of the doghouse constructed with four cut corners along its octagonal circumferential top rim, so that when the top part is attached onto the bottom part, and the four sharp corners of the bottom rim of the top part are aligned above the four cut corners of the top rim of the bottom part respectively, each combination of sharp and cut corners can form a horizontal opening facing downwardly.

It is also an object of the present invention to provide a doghouse utilizing the unique design of the present invention where both the top and the bottom part of the new design doghouse are simply configured without complex window structures, so that both parts can be easily molded as respective single pieces so that the costs of molds and molding process are substantially reduced.

It is an additional object of the present invention to provide a doghouse where the top part and the bottom part are both respective single molded pieces, such that they are both made of molded plastic structural foam material, which offers great durability, thermal insulation, and flea, mildew and bacteria resistance.

It is a further object of the present invention to provide a doghouse where the molded top part and the molded bottom part are attached to each other by interlocking means such as screws, so they can be easily detached for cleaning.

It is also an object of the present invention to provide a doghouse with an elevated floor so that it will provide extra insulation from the elements.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of a prior art doghouse.

FIG. 2 is a perspective view of the top half of the structure of a prior art doghouse.

FIG. 3 is a perspective view of the bottom half of the structure of a prior art doghouse.

FIG. 4 is a perspective view showing the preferred embodiment of the present invention doghouse.

FIG. 5 is a perspective view showing the structure of the top part of the present invention doghouse.

FIG. 6 is a perspective view showing the structure of the bottom part of the present invention doghouse.

FIG. 7 is a cross-sectional view of a pair of joining members such as screw ears.

DETAILED DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, there is shown at 10 a prior art doghouse. For the convenience of describing and analyzing, the structure of prior art doghouse 10 may be broken into a top part 100 shown in FIG. 2 and a bottom part 200 shown in FIG. 3. The door opening is shown at 12. It is emphasized that dividing the structure of prior art doghouse 10 into a top part 100 and a bottom part 200 is merely for the purpose of clearly describing the structural configuration. Prior art doghouses may be made of more than two pieces or just one unitary piece with or without a generally flat floor. However, regardless of the various shapes (such as dome-shaped or arcuate-shaped) and different assemblies (such as two pieces, more than two pieces or just one piece), all doghouses constructed for the purpose of sheltering a dog comprise a roof and surrounding walls, with or without a floor, and therefore can be structurally described as follows.

Referring to FIG. 2, top part 100 is combined by a roof 110, a front end plate 120, a rear end plate 130 and two opposite side plates 140 and 150. Front end plate 120 has a bottom rim 122, rear end plate 130 has a bottom rim 132 and two opposite side plates 140 and 150 each have a bottom rim, 142 and 152 respectively. Bottom rims 122, 132, 142 and 152 form a rectangular circumferential bottom rim 170 of top part 100. Circumferential rim 170 has four straight sections 122, 132, 142 and 152, and four sharp corners 172, 174, 176 and 178 therein between. On front end plate 120 there is a cut opening 102 for door 12.

Referring to FIG. 3, bottom part 200 is combined by a floor 210, a front end wall 220, a rear end wall 230 and two opposite side walls 240 and 250. Front end wall 220 has a top rim 222, rear end wall 230 has a top rim 232 and two opposite side walls 240 and 250 each have a top rim, 242 and 252 respectively. Top rims 222, 232, 242 and 252 form a rectangular circumferential top rim 270 of bottom part 200. Rectangular circumferential top rim 270 has four straight sections 222, 232, 242 and 252, and four sharp corners 272, 274, 276 and 278 therein between. On front end wall 220 there is also a cut opening 202 for door 12.

When top part 100 and bottom part 200 are combined together to form a doghouse, top part 100 is placed above bottom part 200, such that rectangular circumferential bottom rim 170 of top part 100 is exactly fitted with rectangular circumferential top rim 270 of bottom part 200, as shown in FIG. 1. Along the area of joinder of rectangular circumferential bottom rim 170 of top part 100 and rectangular circumferential top rim 270 of bottom part 200 there are no openings. The only opening of the prior art doghouse 10 is door 12 formed by cut opening 102 of top part 100 and cup opening 202 of bottom part 200.

It is emphasized again that although prior art doghouses may have different shapes such as the circumferential rims being round, instead of rectangular, they are all constructed with a tight fit at the area of joinder. For prior art doghouses designed in the form of a unitary dome, the roof and surrounding walls are all part of one single piece which does not have any slit along the joinder area. Therefore, for most of the prior art doghouses, there are no other openings for the doghouse except the door opening, which renders very poor air ventilation. Recently, some doghouses have added a window on the rear end wall or one of the side walls.

However as discussed earlier, these vertically oriented windows create some significant disadvantages.

Consequently, the design of doghouses had reached a point where on one hand it is necessary to have many openings for flow-through fresh air ventilation, and on the other hand the vertically oriented openings such as a rear or side window should be avoided because of their drawbacks. The present invention is a novel structural design which provides unique multi-channel flow-through fresh air ventilation for a doghouse, thus perfectly solving the problem.

Referring to FIG. 4, there is shown at 20 the structure of the present invention doghouse. Present invention doghouse 20 is assembled by two major parts: a top part 300 shown in FIG. 5, and a bottom part 400 shown in FIG. 6. A door opening is shown at 22.

Referring to FIG. 5, top part 300 of the present invention doghouse is combined by a roof 310, a front end plate 320, a rear end plate 330 and two opposite side plates 340 and 350. Front end plate 320 has a bottom rim 322, rear end plate 330 has a bottom rim 332 and two opposite side plates 340 and 350 each have a bottom rim, 342 and 352 respectively. Bottom rims 322, 332, 342 and 352 form a rectangular circumferential bottom rim 370 of top part 300. Circumferential rim 370 has four straight sections 322, 332, 342 and 352, and four corner sections 372, 374, 376 and 378. The difference between the prior art top part 100 and the present invention top part 300 is that the two opposite side plates 340 and 350 extend downwardly more than the front and rear end plates 320 and 330 do. Thus bottom rims 342 and 352 of the two side plates 340 and 350 are lower than bottom rims 322 and 332 of the front and rear end plates 320 and 330. On the inner surface of side plate 340 three screw ears 382, 384 and 386 are mounted on the same level as the bottom rims 322 and 332 of the front and rear end plates 320 and 330. On the inner surface of side plate 350 three screw ears 392, 394 and 396 are also mounted on the same level as the bottom rims 322 and 332 of the front and rear end plates 320 and 330. On front end plate 320 there is a cut opening 302 for door 22.

Referring to FIG. 6, bottom part 400 of present invention doghouse 20 is combined by a floor 410, a front end wall 420, a rear end wall 430 and two opposite side walls 440 and 450. The difference between bottom part 200 of prior art doghouse 10 and bottom part 400 of the present invention doghouse 20 is that floor 410 of bottom part 400 of present invention doghouse 20 is octagonal shaped and there are four more corner walls 462, 464, 466 and 468 between front, rear and two opposite side walls 420, 430, 440 and 450, respectively. All the walls have a respective top rim. Front end wall 420 has a top rim 422, rear end wall 430 has a top rim 432 and two opposite side walls 440 and 450 each have a top rim, 442 and 452 respectively. Four corner walls 462, 464, 466 and 468 each have a top rim, 472, 474, 476 and 478 respectively. Top rims 422, 432, 442, 452, 472, 474, 476 and 478 form an octagonal circumferential top rim 470. Octagonal circumferential top rim 470 of bottom part 400 of present invention doghouse 20 has four straight sections 422, 432, 442 and 452, and four cut corners 472, 474, 476 and 478, with a cut corner between adjacent side wall 440 three screw ears 482, 484 and 486 are mounted adjacent to top rim 440 of side wall 440. On the outer surface of side wall 450 three screw ears 492, 494 and 496 are also mounted adjacent to top rim 452 of side wall 450. On front end wall 420 there is also a cut opening 402 for door 22.

As shown in FIG. 4, when top part 300 is stacked onto bottom part 400 to form the present invention doghouse 20, top part 300 is placed above bottom part 400, such that rectangular circumferential bottom rim 370 of top part 300 is adjacent to octagonal circumferential top rim 470 of bottom part 400, as shown in FIG. 4. The straight sections 322 and 332 of rectangular circumferential bottom rim 370 of top part 300 are aligned with the straight sections 422 and 432 of octagonal circumferential top rim 470 of bottom part 400 respectively, and the straight sections 342 and 352 of rectangular circumferential bottom rim 370 of top part 300 are adjacent to the straight sections 442 and 452 of octagonal circumferential top rim 470 of bottom part 400 respectively. However, the four corner sections 372, 374, 376 and 378 of rectangular circumferential bottom rim 370 of top part 300 can not fit to the four cut corners 472, 474, 476 and 478 of octagonal circumferential top rim 470 of bottom part 400 respectively, and thereby form four horizontal openings 32, 34, 36 and 38 along the area of joinder of rectangular circumferential bottom rim 370 of top part 300 and octagonal circumferential top rim 470 of bottom part 400. Horizontal openings 32, 34, 36 and 38 are all facing downwardly and are shielded by the respective corner portions of top part, 100, so that while providing four-channel flow-through fresh air ventilation areas, they prevent rain drops and or cold wind from directly being blown through them into the present invention doghouse. Still another opening of the present invention doghouse 20 is door 22 formed by cut opening 302 of top part 300 and cup opening 402 of bottom part 400.

Screw ears 382, 384 and 386 of top part 300 are adapted to be coupled with screw ears 482, 484 and 486 of bottom part 400 respectively, and screw ears 392, 394 and 396 of top part 300 are adapted to be coupled with screw ears 492, 494 and 496 of bottom part 400 respectively, as means for interlocking top part 300 and bottom part 400. FIG. 7 shows how screw ears may be coupled. As shown in FIG. 7, screw ear 384 is mounted on the inner surface of side plate 340 of top part 300, and screw ear 484 is mounted on the outer surface of side wall 440 of bottom part 400. They are aligned when top part 300 and bottom part 400 are interlocked together and fastened by a screw 44. Similarly, screw ears 382 and 382, 386 and 486, 392 and 492, 394 and 494, and 396 and 496 may be fastened by screws, respectively (not shown).

The above described interlocking means are easy to assemble and dissemble so that the top part and the bottom part can be easily detached for cleaning. However other suitable attaching means may also be utilized for detachably attaching the top and bottom parts of the present invention together to construct the present invention doghouse.

It will be appreciated that both the top part and the bottom part of the present invention doghouse may be constructed with different configurations, such as hemispherical or hexagonal configurations, and the bottom rim of the top part and the top rim of the bottom part may be generally circular or hexagonal configurations. It is preferred that the bottom part of the present invention doghouse comprises a floor. Nevertheless, it may be constructed without a floor. Door opening 22 may also have different shapes. A flip-flop door may be hingeably attached adjacent to door opening 22. The floor 310 of the bottom part of the present invention doghouse may be elevated so that it will provide extra insulation from the elements.

The present invention doghouse may be made of any suitable material. In the preferred embodiment of the present invention, molded thermoplastic structural foam material is used because it offers great durability, thermal insulation, and flea, mildew and bacteria resistance. Since both the top part and the bottom part of the present invention are simply configured without complex window structures, both parts can be easily molded as respective single pieces so that the cost of molds and the molding process are greatly reduced.

Defined in detail, the present invention is a doghouse with multi-channel flow-through fresh air ventilation comprising: (a) a hollow top part having a arcuate roof, a front end plate, a rear end plate and two opposite side plates, where each plate has a bottom rim, and the bottom rims of the plates form a rectangular circumferential bottom rim of the top part having four straight sections and four sharp corners; (b) a hollow bottom part having a front end wall, a rear end wall, two opposite side walls, four corner walls and an octagonal floor, where each wall has a top rim, and the top rims of the walls form an octagonal circumferential top rim of the bottom part having four straight sections and four cut corners; and (c) an attaching means for detachably attaching said top part onto said bottom part to construct a doghouse, where the rectangular the octagonal circumferential top rim of said bottom part, the four straight sections of the rectangular circumferential bottom rim of said top part are adjacent to the four straight sections of the octagonal circumferential top rim of said bottom part respectively, and the four sharp corners of the rectangular circumferential bottom rim of said top part are located above the four cut corners of the octagonal circumferential top rim of said bottom part respectively and thereby form four horizontal openings facing downwardly and set above the floor of said bottom part; (d) whereby said four horizontal openings provide multi-channel flow-through fresh air ventilation for the doghouse.

In one of the preferred embodiments of the present invention defined in detail, (a) the front end plate of said top part further has a rectangular opening cut from its bottom rim, and the front end wall of said bottom also has a rectangular opening cut from its top rim, whereby when said top part is attached to said bottom part the two openings are aligned to form a door opening for the doghouse; (b) said attaching means is a detachable interlocking means; (c) the height of the walls of said bottom part is about half of the total height of the doghouse; (d) the floor of said bottom part is further elevated to provide additional insulation; (e) said top part is a single molded piece, and said bottom part is also a single molded piece; and (f) said top part is formed of molded thermal-plastic structural foam, and said bottom part is also formed of molded thermal-plastic structural foam.

Defined broadly, the present invention is a doghouse with multi-channel flow-through fresh air ventilation comprising: (a) a hollow top part having a circumferential bottom rim configured with a multiplicity of protruded corners; (b) a hollow bottom part having a circumferential top rim configured with a multiplicity of recessed corners; and (c) an attaching means for detachably attaching said top part onto said bottom part to construct a doghouse, where the circumferential bottom rim of said top part is adjacent to the circumferential top rim of said bottom part, the multiplicity of protruding corners of the circumferential bottom rim of said top part are located above the multiplicity of recessed corners of the circumferential top rim of said bottom part respectively and thereby form a multiplicity of generally horizontal openings facing downwardly; (d) whereby said multiplicity of generally horizontal openings provide multi-channel flow-through fresh air ventilation for the doghouse.

Defined more broadly, the present invention is a doghouse having a multiplicity of openings generally facing downwardly at spaced apart heightened locations, whereby said multiplicity of openings provide multi-channel flow-through fresh air ventilation for the doghouse.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A doghouse with multi-channel flow-through fresh air ventilation comprising:
   a. a hollow top part having a roof, a front end plate, a rear end plate and two opposite side plates, where each plate has a bottom rim, and the bottom rims of the plates form a rectangular circumferential bottom rim of the top part having four straight sections and four sharp corners;
   b. a hollow bottom part having a front end wall, a rear end wall, two opposite side walls, four corner walls and an octagonal floor, where each wall has a top rim, and the top rims of the walls form an octagonal circumferential top rim of the bottom part having four straight sections and four cut corners; and
   c. an attaching means for detachably attaching said top part onto said bottom part to construct a doghouse, where the rectangular circumferential bottom rim of said top part is adjacent to the octagonal circumferential top rim of said bottom part, the four straight sections of the rectangular circumferential bottom rim of said top part are adjacent to the four straight sections of the octagonal circumferential top rim of said bottom part respectively, and the four sharp corners of the rectangular circumferential bottom rim of said top part are located above the four cut corners of the octagonal circumferential top rim of said bottom part respectively and thereby form four horizontal openings facing downwardly and set above the floor of said bottom part;
   d. whereby said four horizontal openings provide multi-channel flow-through fresh air ventilation for the doghouse.

2. The invention as defined in claim 1 wherein the front end plate of said top part further has a rectangular opening cut from its bottom rim, and the front end wall of said bottom part also has a rectangular opening cut from its top rim, whereby when said top part is attached to said bottom part the two openings are aligned to form a door opening for the doghouse.

3. The invention as defined in claim 1 wherein said attaching means is a detachable interlocking means.

4. The invention as defined in claim 1 wherein the height of the walls of said bottom part is about half of the total height of the doghouse.

5. The invention as defined in claim 1 wherein the floor of said bottom part is further elevated to provide additional insulation.

6. The invention as defined in claim 1 wherein said top part is a single molded piece, and said bottom part is also a single molded piece.

7. The invention as defined in claim 6 wherein said top part is formed of molded thermoplastic structural foam, and said bottom part is also formed of molded thermoplastic structural foam.

8. A doghouse with multi-channel flow-through fresh air ventilation comprising:
 a. a hollow top part having a circumferential bottom rim configured with a multiplicity of protruding corners;
 b. a hollow bottom part having a circumferential top rim configured with a multiplicity of recessed corners; and
 c. an attaching means for detachably attaching said top part onto said bottom part to construct a doghouse, where the circumferential bottom rim of said top part is adjacent to the circumferential top rim of said bottom part, the multiplicity of protruded corners of the circumferential bottom rim of said top part are located above the multiplicity of recessed corners of the circumferential top rim of said bottom part respectively and thereby form a multiplicity of generally horizontal openings facing downwardly;
 d. whereby said multiplicity of generally horizontal openings provide multi-channel flow-through fresh air ventilation for the doghouse.

9. The invention as defined in claim 8 wherein the doghouse further has a door opening.

10. The invention as defined in claim 8 wherein said attaching means is a detachable interlocking means.

11. The invention as defined in claim 8 wherein the height of said bottom part is about half of the total height of the doghouse.

12. The invention as defined in claim 8 wherein said bottom part is elevated above the ground to provide additional insulation.

13. The invention as defined in claim 8 wherein said top part is a single molded piece, and said bottom part is also a single molded piece.

14. The invention as defined in claim 13 wherein said top part is formed of molded plastic structural foam, and said bottom part is also formed of molded plastic structural foam.

15. A doghouse with multi-channel flow-through fresh air ventilation comprising:
 a. a hollow top part having a roof, a front end plate, a rear end plate and two opposite side plates each having an inner surface, an outer surface and a bottom rim;
 b. a hollow bottom part having a floor, a front end wall, a rear end wall, and two opposite side walls each having an inner surface, an outer surface and a top rim;
 c. an attaching means for detachable attaching said top part onto said bottom part to construct a doghouse, where the top rims of the two side walls of said bottom part are respectively attached to the inner surfaces of the two side plates of said top part at locations spaced apart from the bottom rims of the two side plates of said top part, such that narrow gaps are maintained respectively between the inner surfaces of the two side plates to said top part and the top rims of the two side walls of said bottom part and shielded respectively by the outwardly and downwardly extended bottom rims of the two side plates of said top part, to thereby form two shielded side openings;
 d. said floor being an octagonal floor; and
 e. the doghouse further comprising four corner walls in said hollow bottom part and four shielded corner openings respectively located above said four corner walls of said hollow bottom part, which are formed as said top part and said bottom part are attached together, to provide multi-channel flow-through fresh air ventilation for the doghouse;
 f. whereby said two shielded side openings provide further multi-channel flow-through fresh air ventilation for the doghouse.

16. The invention as defined in claim 15 wherein the front end plate of said top part further has an opening cut from its bottom rim, and the front end wall of said bottom also has an opening cut from its top rim, whereby when said top part is attached to said bottom part the two openings are aligned to form a door opening for the doghouse.

17. The invention as defined in claim 15 wherein said attaching means is a detachable interlocking means comprising interlocking members positioned at the outer surface of the two side walls of said bottom part at locations adjacent to the top rims of the two side walls of said bottom part, and at the inner surfaces of the two side plates of said top part at locations spaced apart from the bottom rims of the two side plates of said top part.

18. The invention as defined in claim 15 wherein the floor of said bottom part is further elevated to provide additional insulation.

19. The invention as defined in claim 15 wherein said top part is a single molded piece, and said bottom part is also a single molded piece.

20. The invention as defined in claim 19 wherein said top part is formed of molded thermoplastic structural foam, and said bottom part is also formed of molded thermoplastic structural foam.

21. A doghouse with multi-channel flow-through fresh air ventilation comprising:
 a. a hollow top part having a roof, a front end plate, a rear end plate and two opposite side plates each having an inner surface, an outer surface and a bottom rim; where the bottom rims of said front and rear end plates and said side plates forms a bottom rim of the top part;
 b. a hollow bottom part having a front end wall, a rear end wall, and two opposite side walls each having an inner surface, an outer surface and a top rim, where the top rims of said front and rear end walls and said side walls forms a top rim of the bottom part;

c. an attaching means for detachably attaching said top part onto said bottom part to construct a doghouse, wherein said top rim of said bottom part has recessed portions relative to said bottom rim of said top part, which forms elevated and shielded openings when said top part is attached onto said bottom part;

d. when said top part is attached onto said bottom part by said attaching means, said bottom rims of said front and rear end plates of said top part respectively are configured relative to said top rims of said front and rear end walls of said bottom part to prevent water from flowing into the doghouse; and e. said front end plate of said top part further comprising an opening cut from its bottom rim, and said front end wall of said bottom part also comprising an opening cut from its top rim, such that when said top part is attached to said bottom part the two openings are aligned to form a door opening for the doghouse;

f. whereby said two elevated and shielded openings and said door opening provide multi-channel flow-through fresh air ventilation for the doghouse.

22. The invention as defined in claim 21 wherein said attaching means is a detachable interlocking means comprising interlocking members positioned at the outer surface of the two side walls of said bottom part at locations adjacent to the top rims of the two side walls of said bottom part, and at the inner surfaces of the two side plates of said top part at locations spaced apart from the bottom rims of the two side plates of said top part.

23. The invention as defined in claim 21 wherein said top part is a single molded piece, and said bottom part is also a single molded piece.

24. The invention as defined in claim 21 wherein said top part is formed of molded thermoplastic structural foam, and said bottom part is also formed of molded thermoplastic structural foam.

* * * * *